H. CHESHER.
NUT LOCK.
APPLICATION FILED OCT. 21, 1912.
1,087,275.
Patented Feb. 17, 1914.
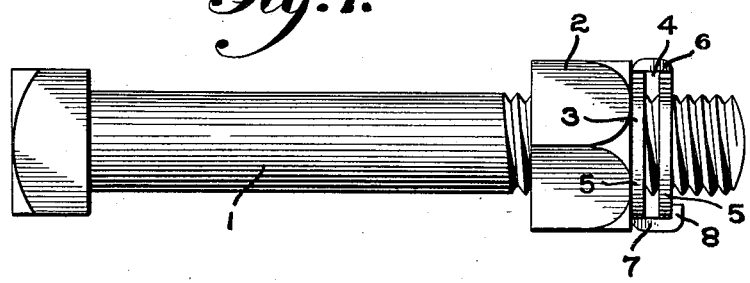
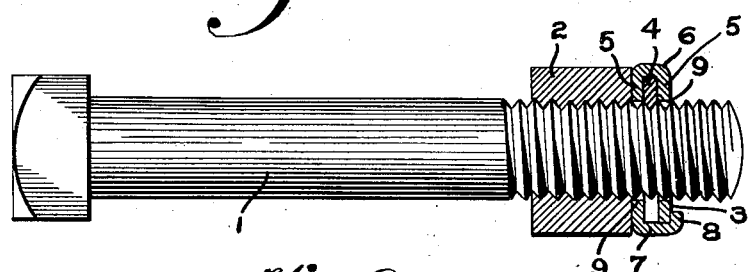
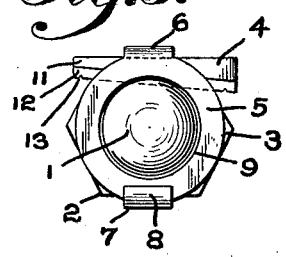
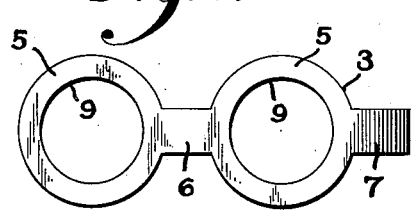
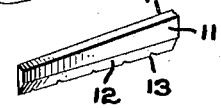
Inventor
Harry Chesher.
Witnesses
By Joshua R. H. Potts
Attorney

UNITED STATES PATENT OFFICE.

HARRY CHESHER, OF PHILADELPHIA, PENNSYLVANIA.

NUT-LOCK.

1,087,275. Specification of Letters Patent. Patented Feb. 17, 1914.

Application filed October 21, 1912. Serial No. 726,857.

*To all whom it may concern:*

Be it known that I, HARRY CHESHER, a citizen of the United States, residing at Philadelphia, in the county of Philadelphia and State of Pennsylvania, have invented certain new and useful Improvements in Nut-Locks, of which the following is a specification.

My invention relates to improvements in nut locks, the object of the invention being to provide improved means for preventing accidental turning movement of the nut on the bolt, which locking means may be used again and again without injury to either the bolt or the nut.

A further object is to provide an improved construction of nut locking key or wedge which cuts its own way into position between the threads of the bolt and securely holds the bolt and nut against independent turning movement.

With these and other objects in view, the invention consists in certain novel features of construction and combinations and arrangements of parts as will be more fully hereinafter described and pointed out in the claim.

In the accompanying drawings: Figure 1 is a view in side elevation illustrating my improvements. Fig. 2 is a view in longitudinal section of Fig. 1. Fig. 3 is an end view of Fig. 1. Fig. 4 is a plan view of the blank from which my improved nut locking washer is made, and Fig. 5 is a perspective view of the locking key.

1 represents an ordinary bolt having a screw-threaded end on which the nut 2 is positioned. Against the outer face of the nut 2, I have illustrated my improved nut locking washer 3 located against the nut, positioned on the bolt, and locked by my improved construction of key 4.

The washer 3 comprises a blank such as illustrated in Fig. 5 consisting of two rings 5, 5, connected by an integral strip 6 at one side, and one of said rings 5 is provided at its side opposite the strip 6, with an integral tongue 7. The strip 6 is bent at two points adjacent the rings 5, 5, and the tongue 7 is bent around the edge of the other ring 5 as clearly shown at 8, so that the two rings 5, 5, are supported in parallelism, it being understood that the openings 9 in the rings are of a size to freely admit the end of the bolt.

Between the rings 5, 5, of the nut locking washer 3, I position my improved locking key 4 with the outer edge of the key against the strip 6. The key 4 is of general wedge shape smaller at one end than at its other end, and is preferably formed with parallel sides 11, 11, and a V-shaped sharp cutting edge 12, the sides of which merge into the parallel sides 11, 11, so that the cutting edge 12 is located in line half way between the side faces 11, 11. This cutting edge 12 is notched at intervals as shown at 13 forming a serrated edge, so that when the key is driven into place, it will cut its own way into the bolt between the threads thereof.

In operation, the key is positioned between the rings 5, until it wedges, it of course being understood that the sharp edge 12 of the key bears against the bolt between the threads thereof. The key is then driven into place by means of a hammer or other suitable tool, so that it securely wedges and locks the washer 3 and nut 2 against accidental turning movement.

The key is sufficiently long to project beyond the nut and washer, so that when it is desired to remove the nut, the key may be forced out by means of sharp blows on the smaller end thereof.

By reason of my improved construction, I provide a nut lock which does not injure either the nut or the bolt, and which allows the bolt and nut to be used over and over again.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A nut lock comprising two rings connected at opposite sides by two strips, one of said strips integral with both rings, the other of said strips integral with one of said rings and bent around the other of said rings, said strips of appreciably less width than the internal diameter of the rings, and a wedge key adapted to be positioned between the rings and the first-mentioned strip, and at its inner edge engage between the threads of a bolt, substantially as described.

In testimony whereof I have signed my name to this specification in the presence of two subscribing witnesses.

HARRY CHESHER.

Witnesses:
C. R. ZIEGLER,
T. W. FOSTER.